United States Patent

Horton

[15] 3,640,271
[45] Feb. 8, 1972

[54] BLOOD FLOW PRESSURE MEASUREMENT TECHNIQUE EMPLOYING INJECTED BUBBLED AND ULTRASONIC FREQUENCY SCANNING

[72] Inventor: John W. Horton, Houston, Tex.

[73] Assignee: International Business Machines Corporation, Armonk, N.Y.

[22] Filed: June 30, 1969

[21] Appl. No.: 837,737

[52] U.S. Cl. ..................128/2.05 D, 73/194 A, 73/388 R, 128/2.05 F
[51] Int. Cl. .........................................A61b 5/02
[58] Field of Search ...............128/2.05 A, 2.05 D, 2.05 F, 128/2.05 M, 2.05 N, 2.05 Q, 2.05 R, 2.05 V, 24 A; 73/194, 388

[56] References Cited

UNITED STATES PATENTS

| 3,403,555 | 10/1968 | Versaci et al. | 128/2.05 F |
| 3,443,433 | 5/1969 | Liston et al. | 128/2.05 F |
| 3,498,290 | 3/1970 | Shaw et al. | 128/2.05 F |
| 3,527,197 | 9/1970 | Ware | 128/2.05 A |

Primary Examiner—William E. Kamm
Attorney—Hanifin and Jancin and John L. Jackson

[57] ABSTRACT

A nonsurgical technique of measuring blood characteristics of pressure and flow by injecting minute gas bubbles into the bloodstream. The bubbles are subjected to a beam of ultrasonic radiation and flow is determined by detecting the resultant scattering which is indicative of the time taken for the bubble to pass between two points, while blood pressure is determined by varying the frequency of the ultrasonic beam to determine the resonant frequency of the bubbles which is proportional to pressure.

7 Claims, 8 Drawing Figures

INVENTOR
JOHN W. HORTON

BY John L. Jackson

ATTORNEY

' 3,640,271

BLOOD FLOW PRESSURE MEASUREMENT TECHNIQUE EMPLOYING INJECTED BUBBLED AND ULTRASONIC FREQUENCY SCANNING

BACKGROUND OF THE INVENTION

1. Field of the Invention

This invention relates to a fluid pressure and flow measuring technique in general, and in particular, to a technique of measuring blood flow and pressure in a nonsurgical manner, by introduction of a gaseous bubble of microscopic size into the bloodstream followed by measuring the rate of flow and pressure by ultrasonic means.

2. Description of the Prior Art

There are several techniques through which an accurate indication of blood flow and pressure can be obtained. However, the more accurate of these techniques require that an artery be surgically exposed. The problems attendant this type of measurement are obvious. In particular, however, with respect to a heart patient, a definite hazard exists when heart catheterization is used. Additionally, the type of activity that the patient can undergo while an artery or vein is catheterized is quite limited. Thus, this type of technique can only be used to monitor blood flow and pressure of a patient at a relatively fixed monitoring station and usually in a state of repose. Furthermore, monitoring for long periods (days) is difficult because indwelling catheters are unsatisfactory. Finally, for obvious reasons, this technique cannot be used for routine physical examinations.

SUMMARY OF INVENTION

Briefly, a technique of measuring blood flow and pressure is provided. Blood flow is measured, in the preferred embodiment, by injecting gaseous bubbles, 0.0025 centimeters in diameter, into the bloodstream. The bubbles are then subjected to ultrasonic energy to cause them to vibrate at or near their resonant frequency. The energy from the bubbles is then detected at a first point and at a second point. The distance between the two points and the time required for the bubble to move between the two points is then utilized to determine blood velocity. This velocity of a number of bubbles across the vessel cross section permits the flow rate to be determined in absolute measure if the radius is known and in relative measure if it is not known.

Blood pressure is determined by controlling the size of the bubble injected in the bloodstream. The bubble is then swept with a signal of varying frequency and the waves scattered from the bubble detected. When the bubble reaches its resonant frequency, the peak amplitude from the transducer detecting the waves from the bubble will be at a maximum and the frequency corresponding to this maximum peak amplitude represents the resonant frequency of the bubble. This resonant frequency is then utilized to determine blood pressure since the resonant frequency of a bubble, if all other factors are equal, of a given size is largely dependent on blood pressure.

DETAILED DESCRIPTION OF THE DRAWINGS

Figure 1:
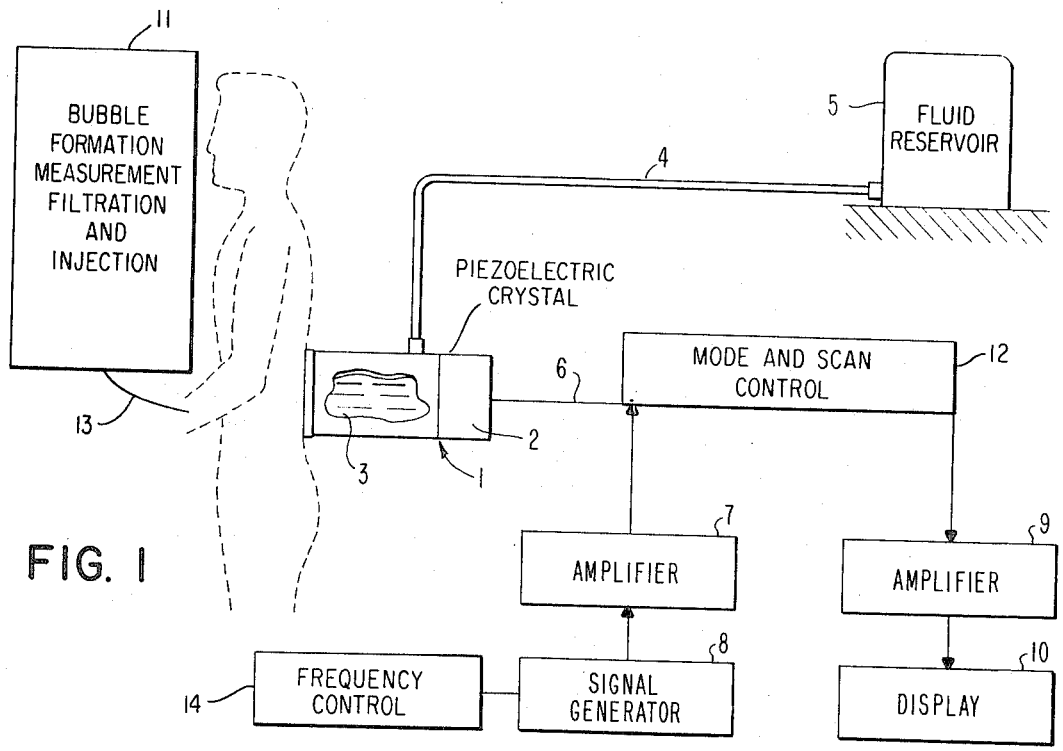
FIG. 1 is a drawing of the subject novel overall blood flow-pressure system.

Refer first to FIG. 1 which is an overall view of the blood flow and pressure setup of the subject invention. A patient is shown with a transducer 1 in contact with a portion of his body. The transducer, as will later be described in more detail, includes a piezoelectric crystal 2 and a fluid coupling chamber 3. Fluid coupling chamber 3 is filled with an impedance matching fluid which acts to couple the crystal 2 to the body. The fluid in the chamber 3 is chosen such that its acoustic impedance characteristics equal to the product of density times sound velocity are closely equal to those of the body near the surface. Water has proven to be satisfactory. Chamber 3 is connected by a tube 4 to a reservoir 5 of the fluid. As will be noted from a consideration of FIG. 1, the reservoir 5 is located above the chamber 3, such that gravity flow is obtained. The chamber 3, as shown, is closed by a crystal 2 at one extremity, and, as will be described in connection with FIG. 2, closed at the opposite end by a polyethylene membrane. The crystal is connected along line 6 to a first amplifier 7, which in turn is driven by signal generator 8. The crystal is also connected along line 6 to a second amplifier 9 and a display 10.

In operation, a signal is generated by signal generator 8 which is controlled by frequency control 14 and is amplified by amplifier 7 and applied to crystal 2, which in a well-known manner produces an ultrasonic wave which passes through the fluid 3 into the body of the patient. In accordance with the present invention, again as will later be described, the beam is focused onto a bubble which has been injected into the bloodstream of the patient and the beam causes the bubble to resonate at or near its resonant frequency. The beam is operated in a duplex mode, which is controlled by well-known mode and scan means 12. That is, the crystal is first used as a generator to cause the bubble to resonate and the receiver amplifier is then blanked for a predetermined period of time. The crystal is then used as a receiver to detect the waves scattered from the bubble. The electrical signal from the crystal in the receive mode is transmitted along line 6 to the amplifier 9 which amplifies the signal for display at 10. As above indicated, the amplitude of the signals displayed on display 10 will increase as the resonant frequency of the bubble is approached and will be at its maximum when the bubble is at its resonant frequency.

Figure 2:
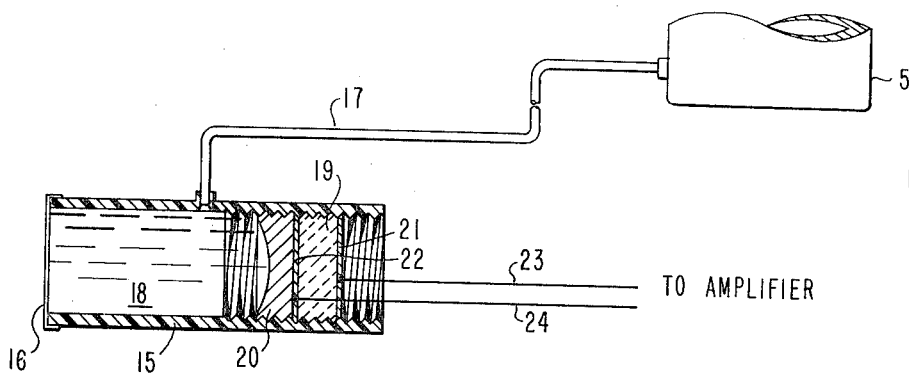
FIG. 2 is a detailed view of the transducer and coupler of FIG. 1.

Refer next to FIG. 2 wherein is shown a detailed view of the crystal and ultrasonic coupler of FIG. 1. In FIG. 2 a cylindrical tube of lucite 15 has mounted on one end thereof a one mil polyethylene membrane 16. The membrane 16 acts to seal that one extremity of the chamber. The chamber is filled with water and is connected along a tube 17 to a reservoir 18 which acts to keep the chamber 18 completely filled. Screwed into the opposite extremity of the cylinder 15 is a crystal 19 and ultrasonic lens arrangement 20. The threads in the chamber allow the focal point of the lens to be changed. Thus, movement of the crystal and lens to the left in FIG. 2 would cause the focal point of the ultrasonic lens to move deeper into the body of the patient. The crystal may be barium titanate or lead zirconate titanate. Plated on each side of the crystal are electrodes 21 and 22 which upon application of a potential thereto cause the crystal to emit ultrasonic waves which are focused by the lens 20. Conversely, upon receipt of waves by the lens 20, the crystal 19 generates signals which are passed by way of electrodes 21 and 22 along lines 23 and 24, respectively to the amplifier.

The crystal can be 2 inches in diameter and is 1 centimeter thick. The electrodes on each side of the crystal can be painted silver and the energizing potential applied to the crystal may be 100 volts. The period of the signal may be 5 microseconds. With a wavelength of 0.75 centimeters, the beam can readily be focused down to 1¼ inches. The diameter of the lucite cylinder must be such that it does not contact the sides of the beam and with respect to the membrane, the thinner the membrane, the better since it must not scatter the ultrasonic energy. Additionally, a metal plate should be attached to the rear side of the crystal to provide damping. A damping factor of 10 was used. This method is described in the book SONICS, by T. Heuter and R. Bolt, pages 63 through 72, published by J. Wiley, Inc., 1955.

The ultrasonic lens 20 is made of rubber and for a lens of 2-inch diameter, it is ground such that the radius of curvature of the lens is 3½ inches. With this type of configuration, as above stated, the focal point of the lens is 4½ inches from the face of the lens.

Obviously, changes in the size of the components above described can be made to optimize the system for use with vessels of varying depths within the body. That is, for deep vessels the coupling chamber could be omitted and the crystal-lens arrangement coupled directly to the body. Also for surface vessels a smaller diameter unit could be used and the focal length reduced to provide a better signal.

Figure 3:
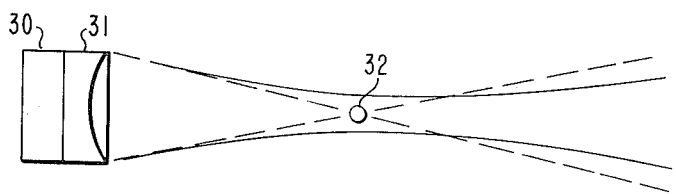
FIG. 3 is a view illustrating an idealized energy beam and the energy beam from the acoustic lens and transducer of FIG. 2.

Refer next to FIG. 3, wherein is shown a crystal 30 and an ultrasonic lens 31. Shown in dotted lines is the ideal ultrasonic output from the lens. This type of output would be provided in the event that the wavelength of the energy is zero. With this type of focusing, the bubble 32 would receive substantially all of the energy from the crystal 30, and consequently, the bubble signal would be a maximum relative to signals from nearby "background" scatterers. However, as a practical matter, this ideal case cannot be achieved, and as illustrated by the solid lines, with a wavelength of 0.75 centimeters while the bubble is enclosed in the energy envelope, some of the energy does not impinge on the bubble. However, even though the width of the envelope adjacent the bubble is 1¼ inches, sufficient energy can be imparted to the bubble to cause it to resonate and the resonating of the bubble can be detected.

Prior to a discussion of particular techniques for determining blood flow and blood pressure, the bubbles which are to be injected into the bloodstream will be discussed. This is represented by block 11 in FIG. 1. The bubbles are formed by agitating a container, having both a blood compatible solution such as a saline solution and a blood compatible gas therein. The gas should contain a fairly large amount of oxygen, so that the bubble will be absorbed into the adjacent tissues after a reasonable period of time. Bubbles of for instance 0.0025 centimeters are drawn into the hypodermic needle having a filter such that only bubbles of the 0.0025 centimeter size and smaller are taken into the needle. In actual practice it has been shown that the timewise taking of the bubbles is quite important. That is, the rate of rise of the bubbles to the surface of the container is largely dependent upon bubble size. Thus, the time and place of taking of the bubbles, subsequent to release from some level in the container, such that bubbles of substantially 0.0025 centimeters are taken, can be determined. This, of course, will depend upon the makeup of the saline solution, as well as the gas which is utilized.

Bubbles can also be made electrolytically by applying a direct current potential across a silver plate and a small (6 mil) platinum wire immersed in an aqueous solution. If positive potential is applied to the platinum wire, oxygen bubbles are produced at the wire. Vibration of the wire aids in causing the bubbles to be uniform in size. If the positive potential is applied to the silver plate, hydrogen bubbles are evolved at the wire. In this case, no vibration is needed.

Following the obtaining of the bubbles of the desired size, for flow measure 100 to 200 bubbles of resonant size are then injected into the bloodstream as represented by line 13.

It is felt that bubbles in the range of 0.001 to 0.01 centimeters in diameter are of the desirable size since bubbles of this size can penetrate into very small vessels before they get stuck and block blood flow and thus the physiological danger of tissue death is kept down. Likewise, even though they are quite small, they are still large enough to give a scattered signal which is large enough to be detected. This signal is uniquely identifiable over signals obtained from any other members of the body. Also, the bubbles are so small that they do not interfere with normal blood flow and their velocity is close to that of the surrounding blood, and therefore, a measure of their velocity is also an excellent measure of blood velocity. The size of the bubble is also chosen such that in the frequency range over which they are resonant, the acoustic energy can readily penetrate into the center of the body.

There are several methods for tracking an object by sonar to develop its velocity and three of these techniques, as applied to the subject invention, will be described.

Figure 4:
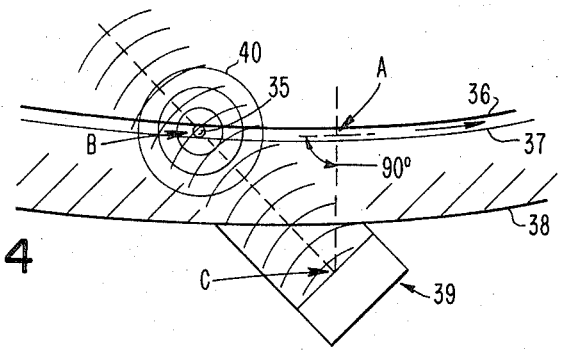
FIG. 4 illustrates a Doppler-shift method of measuring blood flow.

Refer first to FIG. 4 wherein there is illustrated a Doppler method of determining the speed of the bubble. As shown in FIG. 4, the bubble 35 passes through a blood vessel 36 with the blood flow in the direction of the arrow 37. In contact with the body surface 38 is a transmit-receive unit, generally designated at 39, which may be of the type described in detail in connection with FIG. 2. Illustrated in FIG. 4 are waves 40 which are scattered by the bubble when the bubble is subjected to energy at or near its resonant frequency. To determine the speed of the bubble and consequently, the rate or speed of the blood flow, a Doppler technique utilizing a right triangle ABC can be used. In this technique, the direction CA is first located where A is the point of closest approach of the bubble as determined by echo ranging (sonar). The angle ACB is chosen conveniently and then angle CBA is known, since it is the complement of angle ACB. The signal scattered back by the bubble of frequency $f^1$ is higher in frequency than the transmitted signal of frequency $f$ and from a measurement of $f^1-f=\Delta f$, the bubble speed in the vessel is given by the expression $$v = c\, (\Delta f/f)\cos\theta$$

where $c$ is the velocity of sound and $\theta$ is equal to angle CBA.

While the above single crystal technique is operable it might be advisable in certain instances to use a separate crystal for transmitting and receiving, such that a duplex mode is not required and the transmit crystal can send out a continuous wave.

Figure 5:
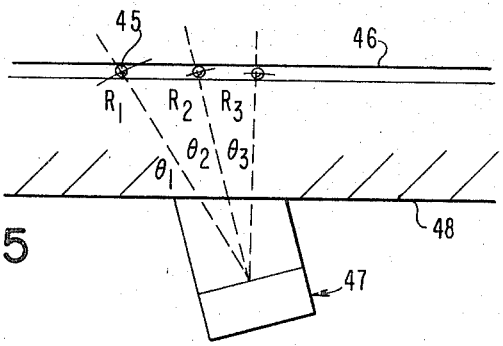
FIG. 5 illustrates a range and tracking method of measuring blood flow.

Another technique of determining the velocity of the bubble is illustrated in FIG. 5. In FIG. 5 the bubble 45 which is passing through the blood vessel 46 is subjected to ultrasonic radiation by the transmit-receive unit 47, which again is in contact with the surface of the body 48. With this type of setup, both range and angle identified by $R_1$, $R_2$, $R_3$, $\theta_1$, $\theta_2$, and $\theta_3$, are determined by the transmit-receive unit 48 operating as a sonar unit, and from this information, the bubble trajectory may be determined and hence, course and speed ascertained. This method is not preferred, however, since its implementation requires that the transducer be mechanically turned in $\theta$.

Figure 6:
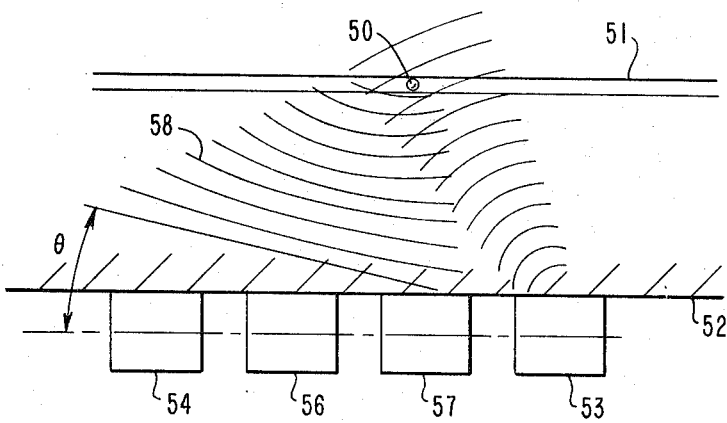
FIG. 6 illustrates a multiple receiver array for measuring blood flow.

In FIG. 6 there is illustrated another technique of determining bubble velocity. In FIG. 6, the bubble 50 passes through the blood vessel 51 and in contact with the body surface 52 is a transmitter 53 and detectors 54, 56, and 57. The technique illustrated in FIG. 6 is desirable, in that with this technique other echoes can be discriminated against. As the echo waves 58 impinge upon the line array of receivers 54 through 57, the outputs of these receives are phase-shifted until their sum is a maximum. This means that an output can be registered only for a wave arriving from a specific direction. By changing the value of the relative phase shift, this specific direction can be altered. Hence, the motion of the bubble can be tracked electronically in an angular direction. The vessel can be located by sonar ranging and bubble speed can then be determined from range and angle information.

Finally, the most unsophisticated technique of determining blood velocity is the utilization of two crystals operating in a duplex mode in which the time taken for the bubble to travel between the two crystals which operate alternatively in a transmit-receive mode is determined, and a straight velocity calculation based upon this time and distance is then calculated.

It should be noted that in the case of most small vessels, bubble speed gives an indication of relative blood flow since the rate of flow of a liquid in a tube is parabolic. That is, it is maximum at its center. It is therefore only where the bubble is in a relatively large vessel and at or near its center that its velocity provides an indication of absolute rate of flow.

Pressure can be obtained by sweeping the bubble with a range of frequencies which include the resonant frequency of the bubble followed by the detection of the frequency at which the bubble is resonant. This will give an accurate indication as to the pressure of the blood. That this is true will become apparent from the following discussion. Although sonic energy is scattered from a bubble of given radius at all frequencies, a much greater amount, a maximum amount, is scattered at a particular frequency $f_o$ called the resonant frequency. To within a factor of better than 1.2 accuracy, this resonant frequency is given approximately by the following formula $$f_o = \frac{1}{2\pi R}\left(\sqrt{\frac{3\gamma P}{\rho}}\right) \quad (1)$$

where $\gamma$ is the ratio of specific heat at constant pressure to specific heat at a constant volume, R is the diameter of the bubble, and P is the pressure of the fluid.

The equation of state for gas in the bubble is $$P(V) = m(R_m T) \quad (2)$$

where $R_m$ is the gas constant per gram, $m$ is the mass of the gas contained in volume $V$, and $T$ is the blood absolute temperature $273° C. + 39° K$. Since $V = (4/3)\pi r^3$, the radius can be expressed in terms of pressure as $$R = (3mR_m T/4\pi P)^{1/3} \quad (3)$$

Therefore, the resonant frequency from equation 1 is dependent upon the fluid pressure as $$f_o = \frac{1}{2\pi}\left(\frac{3\gamma}{\rho}\right)^{1/2}\left(\frac{4\pi}{3mR_m T}\right)^{1/3}(P)^{5/6} \quad (4)$$

From a consideration of the above, it will be apparent that $f_o$ varies almost in proportion to pressure. This will be true so long as the mass of gas in the bubble remains constant. Note that the density and temperature of blood are held constant, normally, by regulating the mechanisms of the body. If they vary in disease this may be known and equation 4 corrected for this. Actually, the gas tends to dissolve into the surrounding plasma and account need be taken of this in general, although for short periods after the bubble is released, this is not important. Thus, by determining that frequency at which the bubble scattering is maximum, the fluid pressure at the bubble can be determined. This means that the fluid pressure can be determined wherever the bubble can get to in the body and this is determined by its size and lifetime before it dissolves.

An alternate technique of measuring pressures which yields more accurate results than the above-described technique involves the measurement of the resonant frequency of the bubble (or a similar bubble) at a known pressure immediately prior to injection into the bloodstream. In this case the temperature of the solution containing the bubble should be substantially equal to the temperature of the blood. The difference between the resonant frequency of the bubble at the known pressure and while in the bloodstream can then be used to determine pressure, assuming $m$ remains constant between the two measurements. Also, it should be noted that the mass changes with time in the blood and should $\Delta t$ become sizeable, this may have to be taken into consideration. This change, of course, can be empirically determined. With respect to the measurement of the resonant frequency of a bubble in a saline solution, it has been found that if the bubble and solution are passed down a latex rubber tube (penrose) and the transducer is acoustically coupled to the tube by a coupler that the resultant scattering by the tube does not severely affect the results achieved.

Figure 7:
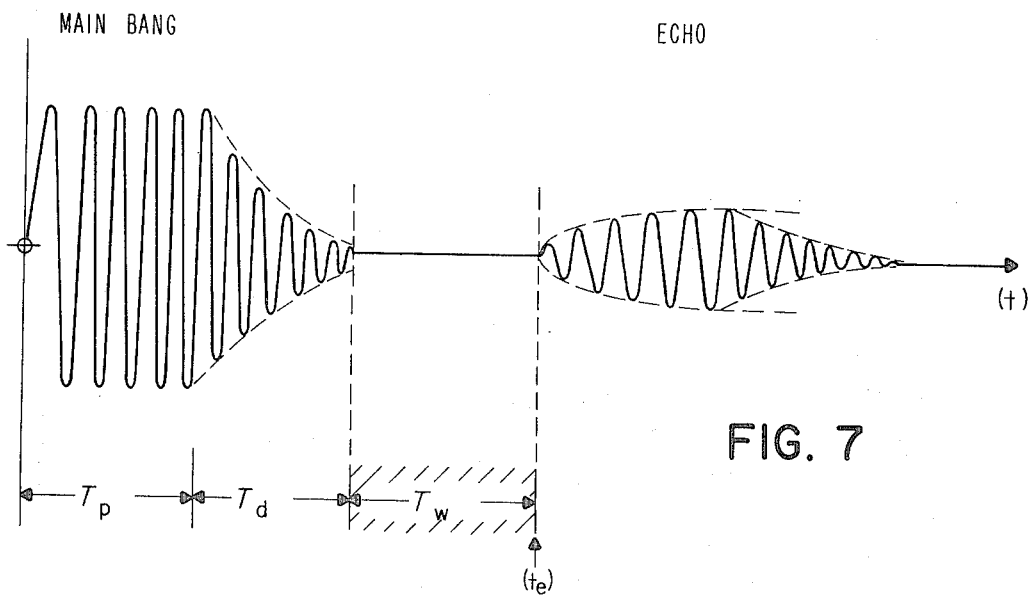
FIG. 7 is a diagram illustrating the timewise application of ultrasonic waves of a given frequency and amplitude to a gaseous bubble and the bubble response thereto.
Figure 8:
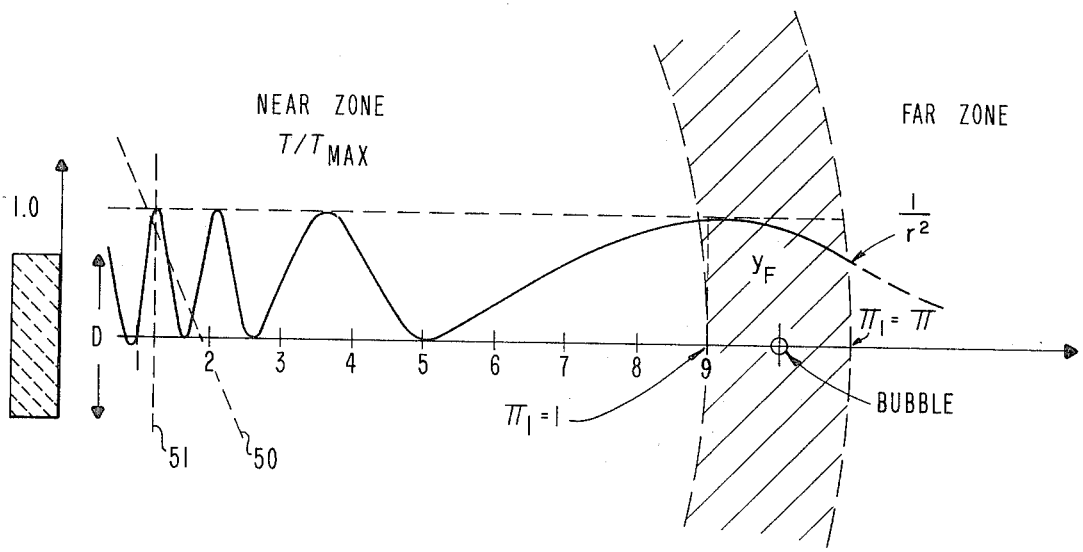
FIG. 8 illustrates the zone energy of a piston radiator, which is the equivalent to the crystal used in the subject invention.

Because the bubble signal is very weak and because of strong background signals, every effort must be made to maximize the former and minimize the latter. This necessitates a discussion of the distance between the lens and the bubble, and the duration of the transmitted signal. Refer to FIGS. 7 and 8 which illustrate a technique described by the inventor at a hereinafter referenced Medicine and Biology Conference. As shown in FIG. 7, an initial period of oscillation occurs in the crystal during the time $\tau_p$. Following this initial period of energization, the oscillation of the crystal decays during the period $\tau_d$ and there is a minimum wait time $\tau_w$. Thus, the period or time $\tau_e$ is the earliest time at which the echo may be detected. The main-bang portion has a constant amplitude during the period $\tau_p$, but the decay during the time $\tau_d$ is exponentially diminishing. The frequency during the time $\tau_p$ and $\tau_d$ is equal. Likewise, the frequency of the echo is equal to the frequency of the main-bang. However, the envelope of the echo rises from an initial value of zero during the period corresponding to the receipt of the main-bang signal and then decays exponentially in a manner similar to the main-bang. From the above it can be seen that in the duplex operation there is always a period $\tau_d + \tau_w$ following the transmitted pulse during which echoes cannot be observed. The earliest time $\tau_e$ at which an echo may be observed is thus $$\tau_e = \tau_p + \tau_d + \tau_w$$

Hence, the closest the bubble may be to the crystal face $Y_B$ is $$Y_B = (\tau_p + \tau_d + \tau_w)(c/2)$$ where $c$ is the speed of sound.

Refer next to FIG. 8 wherein is shown the radiation pattern of a piston radiator. The unsharp boundary between the near and far zones of the piston radiator of diameter $d$ may be defined as $$Y_F = \pi_1 D^2/4\gamma$$

where $\pi_1$ is a number between 1 and $\pi$. An optimum design occurs if $Y_B = Y_F$. As illustrated in FIG. 8, when the bubble is placed a distance $Y_F$ from the piston radiator as the bubble passes through the zone, it is always in the energy zone; whereas, if the bubble were to pass on a skewed path, such as illustrated by path 50, the bubble would pass in and out of the energy zone. It is only in the case of the near zone where the bubble passes in ideal alignment, as illustrated by path 51, that the near zone can be used. Thus for a generalized case, it is desirable that the bubble be in the far zone defined by the distance range $(1 < \pi_1 < \pi)$ $$Y_F = \pi_1 D^2/4\gamma$$

This is a working zone. For distances $> \pi_1 = \pi$, the signal is lost. For distances $< \pi_1 = 1$, the near zone is entered. The above radiation pattern for the piston radiator and discussion of the near and far zone is given in more detail in the book, SONICS by T. Hueter and R. Bolt, pages 63 through 72, published by J. Wiley, Inc., 1955.

Additionally in a paper published in the Proceedings of the Annual Conference, Engineering in Medicine and Biology, Nov. 13, 1968, at page 84, entitled "Maximum Sonar Echoes from a Gas Bubble in Blood," by the inventor a discussion of the maximum signal from a bubble in blood appears.

In summary there has been provided a novel method of nonsurgically determining blood flow and blood pressure in blood in which a blood compatible liquid containing a gaseous bubble of desired size is injected into the bloodstream and subjected to a beam of ultrasonic radiation. In the case of blood flow measurement, the resultant scattered energy from the bubble may be used by a Doppler technique or similar sonic technique to determine the rate of flow of the bubble which is nearly equal to that of the blood.

Alternately, the bubble is subjected to ultrasonic energy to cause the bubble to vibrate at or near its resonant frequency. The energy from the bubble is then detected at a first point and at a second point. The distance between the two points and the time required for the bubble to move between the two points is then utilized to determine blood velocity.

Blood pressure is determined by accurately controlling the size of the bubble injected in the bloodstream. The bubble is then swept with a signal of varying frequency and the waves scattered from the bubble detected. When the bubble reaches it resonant frequency, the peak amplitude from the transducer detecting the waves from the bubble will be at a maximum and the frequency corresponding to this maximum peak amplitude represents the resonant frequency of the bubble. This resonant frequency is then utilized to determine blood pressure since the resonant frequency of a bubble, if all other factors are equal, of a given size is largely dependent on blood pressure.

While the subject invention has been described in connection with an ultrasonic transducer having a damping factor of 10, it will be obvious that other techniques of imparting energy to the bubbles can be used which fall within the spirit and scope of the following claims. For instance, a shock method, analogous to striking a tuning fork with a hammer, may be used. With a shock exciting technique a shock is applied to the bubble and a ringing echo indicative of the resonant frequency of the bubble would be received. In this case the transmitting crystal should have a Q or damping factor of 1, while the receiving crystal should have a relatively high Q to suppress background noise and enhance the ringing.

Also, while blood flow and pressure have been discussed, the subject inventive technique is equally applicable to other body fluids, such as spinal fluid.

While the invention has been particularly shown and described with reference to preferred embodiments thereof, it will be understood by those skilled in the art that various changes in the form and details may be made therein without departing from the spirit and scope of the invention.

What is claimed is:

1. The method of determining blood pressure in a bloodstream comprising:
    injecting a blood compatible solution containing gaseous bubbles into said bloodstream, said solution being filtered to inject only one said bubble at a time into the bloodstream;
    detecting the resonant frequency of a bubble at a known pressure immediately prior to entering the bloodstream;
    detecting the resonant frequency of said bubble after entering the bloodstream; and
    determining the pressure of said bloodstream by determining the difference between said first detected resonant frequency and said second detected resonant frequency adjusted for temperature variations, and slight changes in mass if such occurs, and relating said frequencies to said known pressure in accordance with a definition of the relationships of the resonant frequency of bubbles of said gas to pressure gradients.

2. A method of determining blood characteristics such as pressure and rate of flow in a bloodstream under the surface of the body, comprising the steps of:
    injecting a blood-compatible solution containing gaseous bubbles in the range of 0.001 to 0.01 centimeters in diameter into said bloodstream,
    subjecting a bubble to a scan of ultrasonic radiation having a frequency range including a frequency equal to the resonant frequency of said bubble to produce a scattered wave from said bubble which is at its maximum at the resonant frequency of said bubble,
    detecting the occurrence of the maximum of said scattered wave,
    correlating said maximum with said frequency scan to determine the resonant frequency of said bubble, and
    determining the pressure of said blood based on the resonant frequency of said bubble.

3. The method of claim 2, wherein said pressure based on the resonant frequency of said bubble is determined from the following relationship:

$$f_o = \frac{1}{2\pi}(3\gamma\rho)^{1/2}\left(\frac{4\pi}{3mR_mT}\right)^{1/3}(P)^{5/6}$$

where $f_o$ is the resonant frequency of said bubble, $\gamma$ is the ratio of specific heat at constant pressure to specific heat at constant volume, $R_m$ is the gas constant per gram, $m$ is the mass of gas per volume, $T$ is the blood temperature, and $\rho$ is the density of the blood.

4. The method of claim 2, wherein a determination of blood flow based on the detection of said scattered wave is obtained by a Doppler shift technique in accordance with the following expression:

$$V = c(\Delta f/f\cos\theta)$$

where $c$ is the velocity of sound, $\Delta f$ is the Doppler frequency shift, $f$ is the frequency of the ultrasonic radiation, and $\theta$ is the angle of the ultrasonic radiation relative to the bloodstream.

5. The method of claim 2, wherein the source of said ultrasonic radiation and detector of said scattered wave are a single transducer operating in a duplex mode of alternate transmission and reception.

6. The method of claim 2, wherein said ultrasonic radiation is applied at two points along said bloodstream to provide an indication of the arrival of said bubble at said two points and the velocity of said bubble determined from the distance between said two points and the time taken by said bubble passing therebetween.

7. The method of claim 5, wherein said bubble is subjected to said ultrasonic radiation through a space between said source of ultrasonic radiation and said body surface which is filled with an impedance matching liquid having a wave impedance substantially equal to that of said body.

* * * * *